United States Patent [19]

Bach

[11] 4,322,911
[45] Apr. 6, 1982

[54] VINE SUPPORT FOR PLANTS

[76] Inventor: William D. Bach, 2141 Yancy Ave., Montgomery, Ala. 36107

[21] Appl. No.: 174,685

[22] Filed: Aug. 1, 1980

[51] Int. Cl.³ .............................................. A01G 17/06
[52] U.S. Cl. .......................................... 47/45; 47/46; 256/1
[58] Field of Search ......................... 47/45–47, 47/42–44; 248/164, 431; 256/17, 18, 21, 22, 32, 33, 50, 52, 58, 34–36, 45–49, 53, 65–67, 1; 403/217, 218, 390, 391

[56] References Cited

U.S. PATENT DOCUMENTS

| | | | |
|---|---|---|---|
| 1,336,580 | 4/1920 | Parr | 256/21 |
| 1,556,373 | 10/1925 | Thoeni | 47/47 |
| 1,922,269 | 8/1933 | Wickwire | 256/45 |
| 2,618,902 | 11/1952 | Prescott | 47/47 |
| 2,906,062 | 9/1959 | Hohenfeldt | 47/47 |
| 3,185,164 | 5/1965 | Pinero | 248/431 X |

FOREIGN PATENT DOCUMENTS

| | | | |
|---|---|---|---|
| 443768 | 2/1968 | Switzerland | 47/47 |
| 712965 | 8/1954 | United Kingdom | 47/45 |

Primary Examiner—James R. Feyrer
Attorney, Agent, or Firm—Woodford R. Thompson, Jr.

[57] ABSTRACT

Pairs of upstanding wire-like members have their lower ends positioned adjacent each other and anchored in the ground in longitudinal spaced relation to each other. Adjacent wire-like members of adjacent pairs extend upwardly across each other and form spaced apart upper end portions. Each upper end portion terminates alongside the upper end portion of a next adjacent wire-like member of a next adjacent pair of wire-like members to form spaced apart pairs of upper end portions. A sleeve-like connector element telescopes over the crossed portions of adjacent wire-like members. A connector member extends between and detachably connects the adjacent pairs of spaced apart upper end portions.

2 Claims, 13 Drawing Figures

VINE SUPPORT FOR PLANTS

BACKGROUND OF THE INVENTION

This invention relates to apparatus for supporting vines and more particularly to a vine support for plants such as flowers, and vegetables, including beans, tomatoes or the like.

Heretofore in the art to which my invention relates, various devices have been devised for supporting vines of plants, such as by assemblying wood poles where the lower ends thereof are anchored in the ground and the upper ends are tied to an elongated, horizontal support member in the form of strips, flexible wire members or the like. Difficulties have been encountered with such devices due to the fact that they require a considerable amount of time and effort to assemble and disassemble. Also, these prior devices with which I am familiar, present an unsightly appearance when exposed to view after the harvest season. Accordingly, they are usually taken down and stored until the next season, thus requiring a large storage space.

SUMMARY OF THE INVENTION

In accordance with my invention I overcome the above and other difficulties by providing a vine support for plants which is simple of construction, economical of manufacture and requires a minimum of effort for installation in a quick and easy manner. My improved apparatus is self-supporting and presents a more desirable appearance than the prior art devices mentioned above, thus eliminating the cumbersome task of disassembly and storage at the end of each harvest season. Although, if desired, my improved support may be disassembled quickly and easily, and stored in a minimum of space.

My improved vine support embodies a plurality of pairs of upstanding wire-like members with the lower ends thereof being anchored in the ground in spaced relation to each other and with adjacent wire-like members of adjacent pairs extending upwardly across each other and terminating in spaced apart upper end portions. A connector means extends between and detachably connects adjacent spaced apart pairs of upper end portions to each other, to thus form a self-supporting vine support for plants.

DESCRIPTION OF THE DRAWINGS

Apparatus embodying features of my invention is illustrated in the accompanying drawings, forming a part of this application, in which.

DETAILED DESCRIPTION

Figure 1:
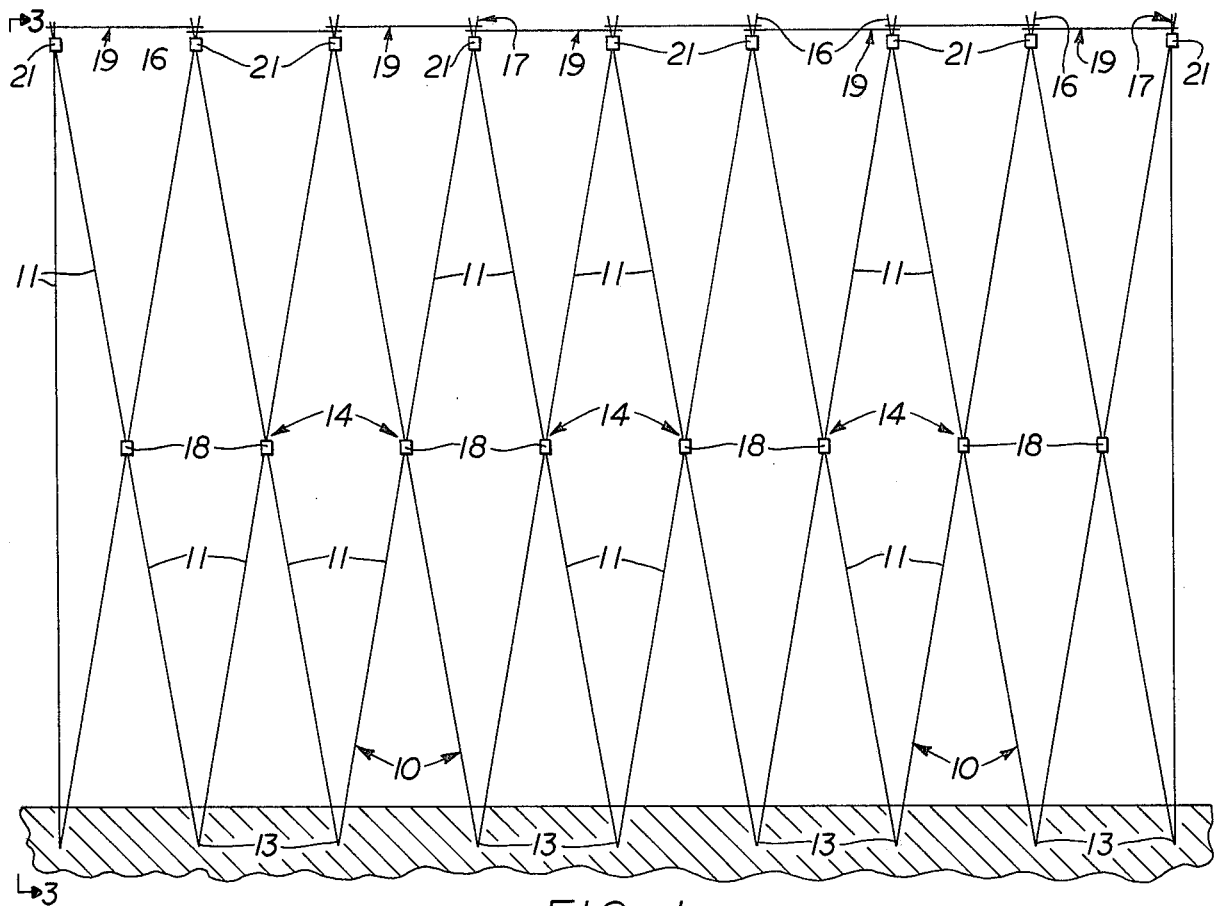
FIG. 1 is a side elevational view showing the vine support in the assembled position.
Figure 10:
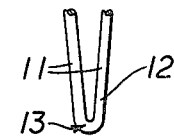
FIG. 10 is an enlarged view showing the lower ends of each pair of upwardly projecting wire-like members as being formed integrally with each other.

Referring now to the drawings for a better understanding of my invention, I show in FIG. 1 my improved vine support as embodying a plurality of pairs 10 of upstanding wire-like members 11 assembled with the lower ends of each pair being adjacent each other and anchored in the ground with such pairs being in longitudinal spaced relation to each other. The lower ends 12 of each pair of wire-like members 11 terminate adjacent each other and may be separate wire-like members or may be integrally formed with each other as shown in FIGS. 1 and 10 to define a generally U-shaped portion 13. The lower ends 12 of each pair of wire-like members 11 may also be joined together by other suitable means, not shown, such as by welding. Adjacent wire-like members 11 of adjacent pairs 10 extend upwardly in crossed relation to each other, as at 14, and terminate in upper end portions 16. Each upper end portion 16 thus terminates alongside the upper end portion 16 of a next adjacent wire-like member 11 of the next adjacent pair 10 of wire-like members to define pairs of spaced apart upper end portions indicated generally at 17.

Figure 2:
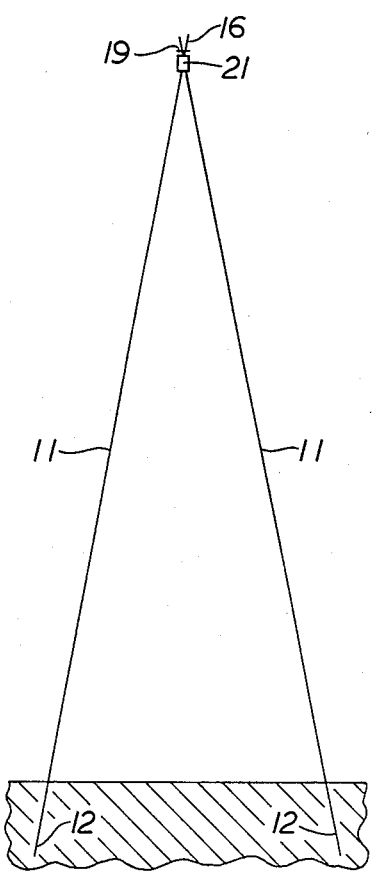
FIG. 2 is a top plan view of the vine support as shown in FIG. 1.
Figure 3:
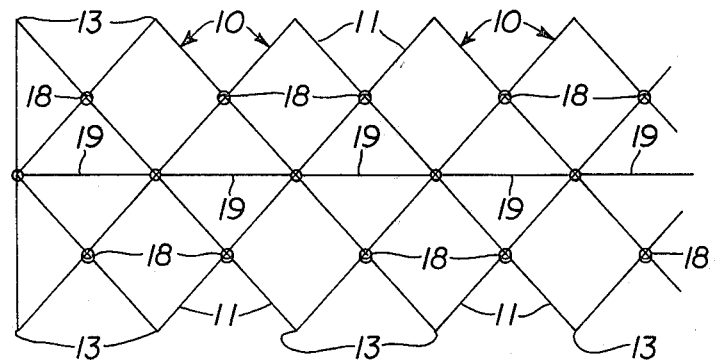
FIG. 3 is an end view taken generally along lines 3—3 of FIG. 1.
Figure 6:
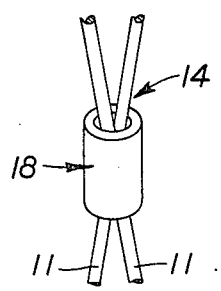
FIG. 6 is an enlarged perspective view showing the cylindrical sleeve-like element which telescopes over the crossed portion of adjacent wire-like members.
Figure 7:
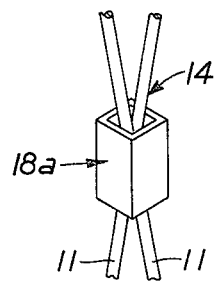
FIG. 7 is a perspective view showing the sleeve-like element positioned over the crossed portion as being rectangular as viewed in cross section.
Figure 8:
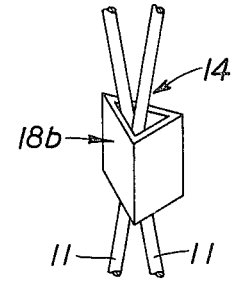
FIG. 8 is a perspective view showing the sleeve-like element positioned over the crossed portion as being triangular as viewed in cross section.
Figure 9:
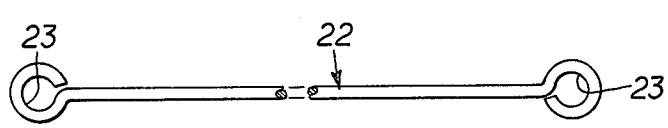
FIG. 9 is an enlarged view of the wire-like element used with the connector means shown in FIG. 4.

A sleeve-like element 18 telescopes over each crossed portion 14 of adjacent wire-like members 11 of adjacent pairs 10 as shown in FIGS. 1, 2 and 6. While I have shown the sleeve-like element 18 as being cylindrical, it will be understood that it may assume other polygonal forms such as rectangular in cross section, as shown at 18$^a$ in FIG. 7, or triangular in cross section, as shown at 18$^b$ in FIG. 8.

Figure 4:
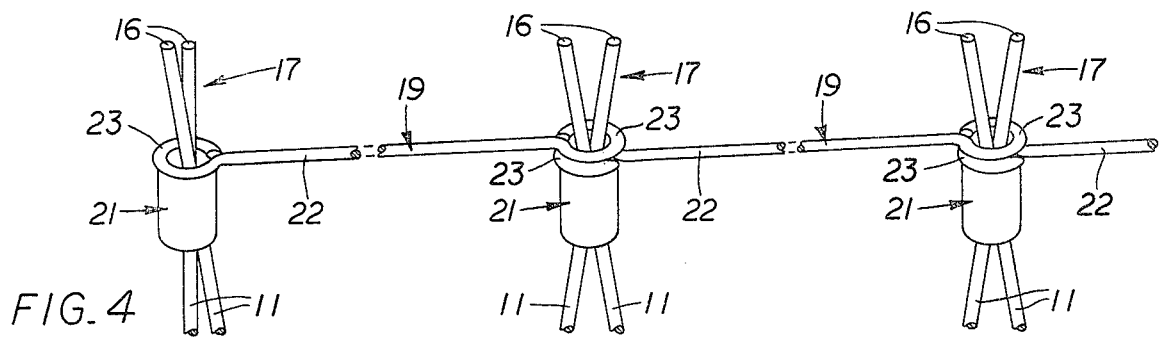
FIG. 4 is an enlarged perspective view showing means for detachably connecting adjacent pairs of spaced apart upper end portions to each other.
Figure 5:
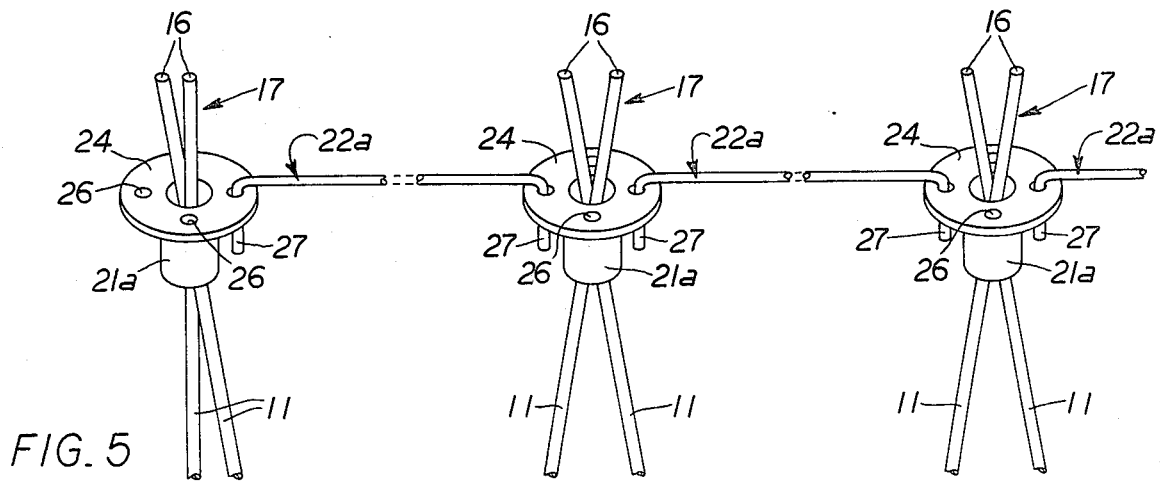
FIG. 5 is a perspective view showing a modified form of means for detachably connecting adjacent pairs of spaced apart upper end portions to each other.

A connector member indicated generally at 19 extends between and detachably connects adjacent pairs 17 of spaced apart upper end portions 16 as shown in FIGS. 1, 2 and 4. Each connector member 19 includes a sleeve-like member 21 which telescopes over each pair 17 of upper end portions 16 and an elongated wire-like member 22 having loop-like end portions which define openings 23 at each end thereof. As shown in FIG. 4, each opening 23 is in position to telescope over its adjacent pair 17 of upper end portions 16. Instead of employing the connector member 19 as as shown in FIG. 4, an outwardly and radially extending member, such as a flange 24, may be carried by a sleeve-like member 21$^a$ which telescopes over its adjacent pair 17 of upper end portions 16 as shown in FIG. 5. The flange 24 is provided with a plurality of spaced apart openings 26 with each opening receiving a laterally extending leg 27 depending from each end of a wire-like member 22$^a$ as shown. While I have shown the sleeve-like member 21$^a$ as being cylindrical, it may assume other shapes.

From the foregoing description, the operation of my improved vine support for plants shown in FIGS. 1-10 will be readily understood. A plurality of pairs 10 of upstanding wire-like members 11 are positioned in longitudinally spaced relation to each other with the lower end 12 of each pair being anchored in the ground and with adjacent wire-like members 11 of adjacent pairs 10 extending upwardly across each other and terminating in spaced apart upper end portions 16.

A sleeve-like element 18 is then telescoped over the crossed portions 14 of adjacent wire-like elements 11 of adjacent pairs 10 for restraining relative movement of the crossed portions.

As shown in FIGS. 4 and 5 each of the upper end portions 16 extends alongside the upper end portion 16 of the next adjacent wire-like member 11 of the next adjacent pair of wire-like members to define pairs 17 of spaced apart upper end portions.

After positioning the sleeve-like element 18, a sleeve-like element 21 is then telescoped over each pair 17 of upper end portions 16. The openings 23 defined by the loop-like member at each end of the wire-like elements 22 is then telescoped over the pair 17 of upper end portions 16 adjacent thereto to thus form a self-supporting vine support for plants.

Figure 11:
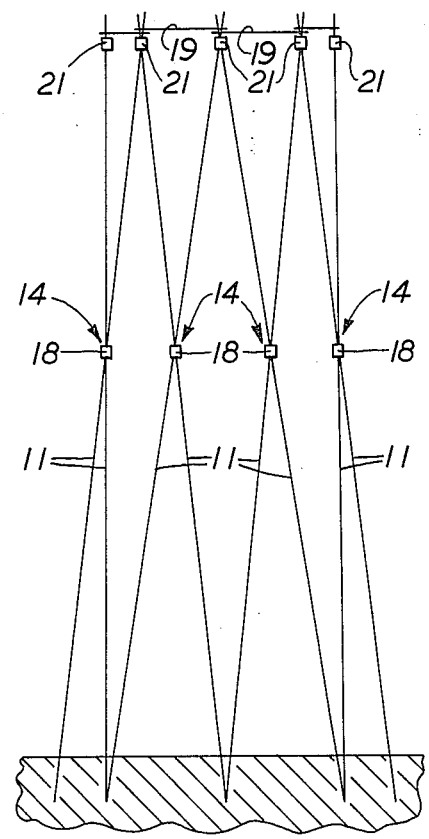
FIG. 11 is an elevational view showing a modification of my invention in which the vine support is assembled in a generally annular or octagonal configuration.
Figure 12:
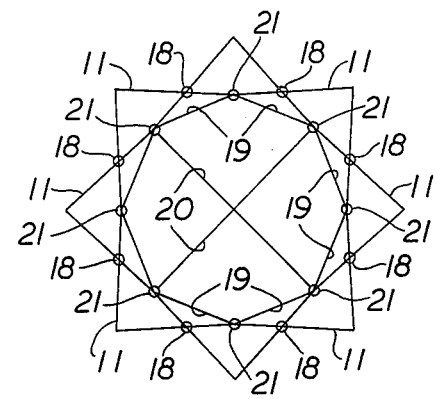
FIG. 12 is a top plan view of the vine support shown in FIG. 11.
Figure 13:
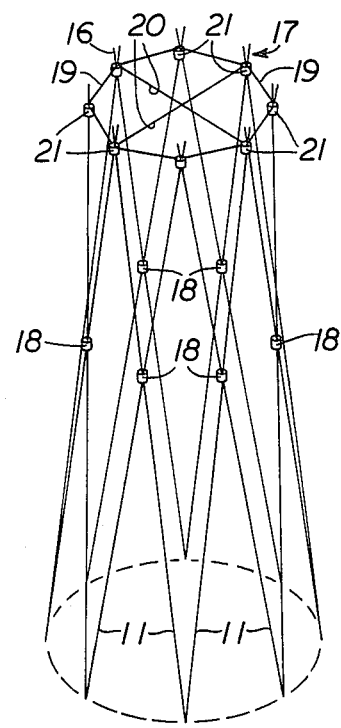
FIG. 13 is a perspective view of the vine support shown in FIG. 11.

In FIGS. 11, 12 and 13, I show a modified form of my invention in which the vine support is assembled in a generally octagonal or annular configuration. A plurality of the pairs 10 of upstanding wire-like members 11 are assembled with the lower ends 12 thereof anchored in the ground in angularly spaced relation to each other. Each pair 10 of upstanding wire-like members 11 is shown as being positioned at substantially the same distance from a center point. Adjacent wire-like members 11 of adjacent pairs 10 extend upwardly in crossed relation to each other, as described hereinabove, with each upper end portion 16 terminating alongside the upper end portion 16 of the next adjacent wire-like member 11 of the next adjacent pair 10, to define angularly spaced pairs of upper end portions 17. Also, each sleeve-like element 18 is telescoped over the crossed portions 14 and the connector member 19 is then positioned between and is detachably connected to the adjacent pairs 17 of upper end portions 16, to form a vine support of a generally annular configuration. It will be apparent that the vine support may also be of other polygonal shapes, as viewed from the top. To add stability to the vine support shown in FIGS. 11, 12 and 13, suitable brace members 20 extend between and detachably connect oppositely disposed pairs of upper end portions 17. The brace members 20 may be similar to the connector members 19 described above.

From the foregoing it will be seen that I have devised an improved vine support for plants which is simple of construction and manufacture and can be quickly and easily assembled and disassembled with a minimum of effort. Also, my improved vine support is self-supporting and presents a vine support which is neat in appearance. Furthermore, my improved vine support is adapted for permanent installation thus eliminating the task of assembly and storage at the end of each harvest season.

While I have shown my invention in several forms, it will be obvious to those skilled in the art that it is not so limited, but is susceptible of various other changes and modifications without departing from the spirit thereof.

What I claim is:

1. A vine support for plants comprising:
    (a) a plurality of pairs of upstanding wire-like members with the lower ends of the wire-like members of each pair being connected to each other and adapted to be anchored in the ground in spaced relation to each other with adjacent wire-like members of adjacent pairs extending upwardly across each other and terminating in spaced apart upper end portions,
    (b) a sleeve-like element telescoping over the crossed portions of adjacent wire-like members of adjacent pairs restraining relative movement of said crossed portions,
    (c) each of said upper end portions extending alongside the upper end portion of the next adjacent wire-like member of the next adjacent pair of wire-like members to define pairs of spaced apart upper end portions,
    (d) a sleeve-like member telescoping over each said pair of upper end portions, and
    (e) an elongated wire-like connector member extending between adjacent pairs of said upper end portions and having loop-like end portions which telescope over and detachably connect said adjacent pairs of upper end portions.

2. A vine support for plants as defined in claim 1 in which the lower ends of each said pair of upstanding wire-like members are formed integrally with each other to define a generally U-shaped lower end portion.

* * * * *